United States Patent
Hull

(10) Patent No.: US 10,016,705 B2
(45) Date of Patent: Jul. 10, 2018

(54) WATER FILTRATION DEVICE FOR PURIFYING WATER

(71) Applicant: James Hull, Arvada, CO (US)

(72) Inventor: James Hull, Arvada, CO (US)

( * ) Notice: Subject to any disclaimer, the term of this patent is extended or adjusted under 35 U.S.C. 154(b) by 248 days.

(21) Appl. No.: 14/934,993

(22) Filed: Nov. 6, 2015

(65) Prior Publication Data
US 2017/0128863 A1    May 11, 2017

(51) Int. Cl.
| | |
|---|---|
| B01D 29/07 | (2006.01) |
| B01D 39/10 | (2006.01) |
| B01D 35/00 | (2006.01) |
| B01D 35/30 | (2006.01) |
| C02F 9/00 | (2006.01) |
| B01D 29/56 | (2006.01) |
| B01D 29/05 | (2006.01) |
| C02F 1/00 | (2006.01) |

(52) U.S. Cl.
CPC ............ *B01D 29/56* (2013.01); *B01D 29/05* (2013.01); *C02F 1/002* (2013.01); *C02F 2201/004* (2013.01); *C02F 2201/007* (2013.01)

(58) Field of Classification Search
CPC ............ B01D 29/03; B01D 2201/0407; B01D 2201/10; B01D 29/23
USPC .................................. 210/232, 241, 405, 499
See application file for complete search history.

(56) References Cited

U.S. PATENT DOCUMENTS

| | | | | |
|---|---|---|---|---|
| 4,025,435 | A * | 5/1977 | Shea ...................... | B01D 29/27 210/250 |
| 4,689,058 | A * | 8/1987 | Vogt ..................... | B01D 39/163 55/486 |
| 4,731,177 | A * | 3/1988 | Hemman ............... | B01D 29/03 210/241 |
| 4,946,591 | A | 8/1990 | Mealey | |
| 5,776,567 | A | 7/1998 | Schilling et al. | |
| 5,853,581 | A | 12/1998 | Rayborn et al. | |
| 6,000,094 | A | 12/1999 | Young | |
| D432,421 | S | 10/2000 | Sullivan, Jr. | |
| 6,761,271 | B1 | 7/2004 | Cresswell | |
| 8,042,215 | B2 | 10/2011 | Thibault | |
| 2003/0075492 | A1* | 4/2003 | Kuo ....................... | B01D 25/26 210/231 |
| 2010/0122953 | A1 | 5/2010 | Yu | |
| 2011/0303623 | A1* | 12/2011 | Caldwell ................. | C02F 1/003 210/807 |
| 2014/0014571 | A1* | 1/2014 | Nelson .................... | C02F 1/002 210/468 |
| 2014/0166597 | A1* | 6/2014 | Khamal .................. | C02F 1/004 210/806 |

(Continued)

*Primary Examiner* — Ana Fortuna

(57) ABSTRACT

A water filtration device for purifying water includes a housing, a tap, a top cover, a plurality of filters, and a handle. The housing has an upper opening, a closed bottom and a sidewall. The tap extends through the sidewall proximate to the bottom. The top cover has a rim and a porous medial surface that extends inwardly from the rim. The rim is configured to engage the sidewall to cover the opening. Each of the filters in the plurality of filters has an upper edge, a lower edge, and a mesh that extends inwardly from the lower edge. The handle has a pair of attachment ends and a central grasping section. The pair of attachment ends is configured to engage an associated pair of opposing attachment points coupled to the exterior surface of the sidewall proximate to the upper opening.

14 Claims, 5 Drawing Sheets

(56) References Cited

U.S. PATENT DOCUMENTS

2014/0263014 A1\* 9/2014 Moser .................. C02F 1/003
  210/202
2017/0128863 A1\* 5/2017 Hull ..................... B01D 35/30

\* cited by examiner

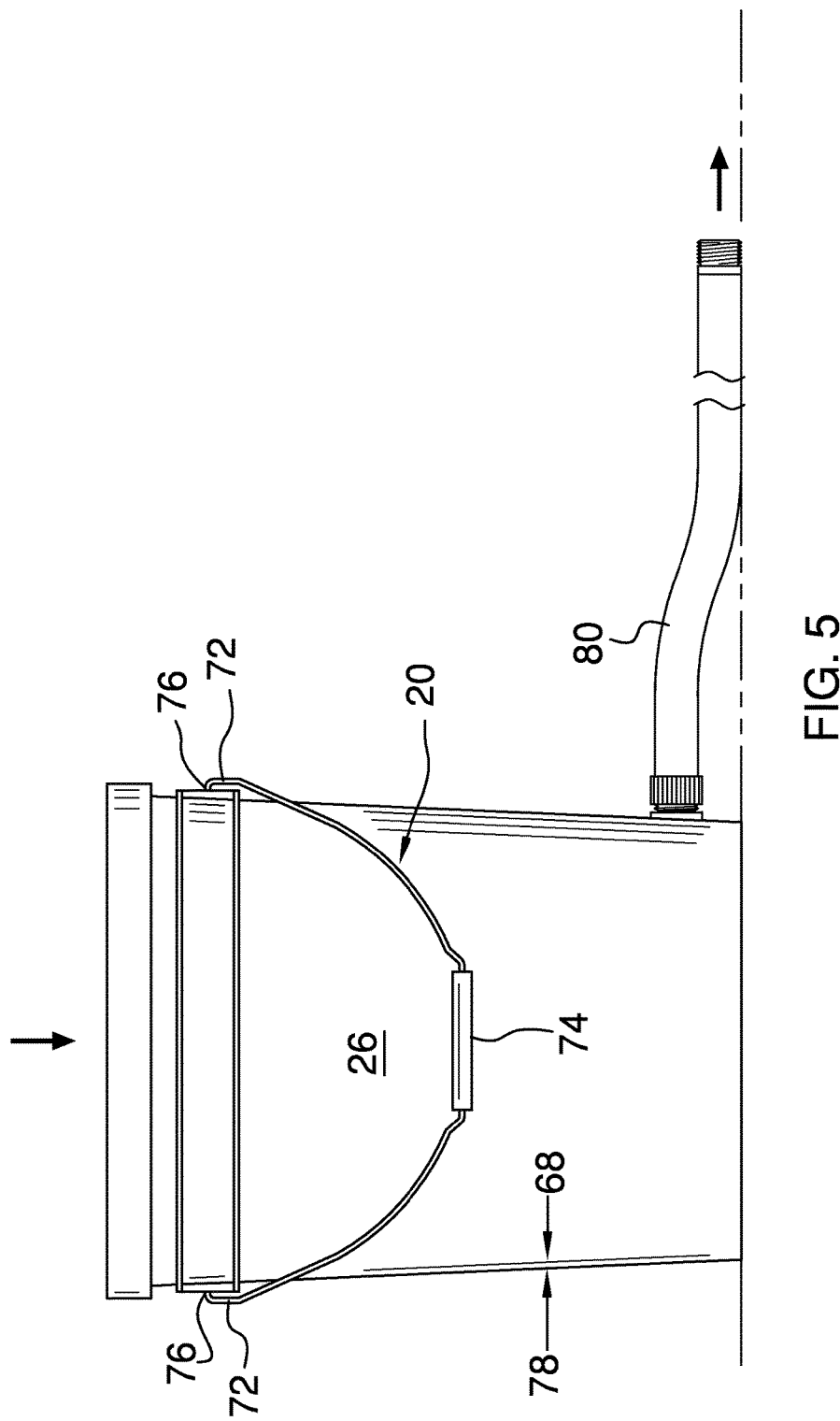

WATER FILTRATION DEVICE FOR PURIFYING WATER

BACKGROUND OF THE DISCLOSURE

Field of the Disclosure

The disclosure relates to water filtration devices and more particularly pertains to a new water filtration device for purifying water.

SUMMARY OF THE DISCLOSURE

An embodiment of the disclosure meets the needs presented above by generally comprising a housing, a tap, a top cover, a plurality of filters, and a handle. The housing has an upper opening, a closed bottom and a sidewall. The tap extends through the sidewall proximate to the bottom. The top cover has a rim and a porous medial surface that extends inwardly from the rim. The rim is configured to engage the sidewall to cover the opening. Each of the filters in the plurality of filters has an upper edge, a lower edge, and a mesh that extends inwardly from the lower edge. The handle has a pair of attachment ends and a central grasping section. The pair of attachment ends is configured to engage an associated pair of opposing attachment points coupled to the exterior surface of the sidewall proximate to the upper opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is an in-use front view of an embodiment of the disclosure.

DESCRIPTION OF THE PREFERRED EMBODIMENT

Figure 1:
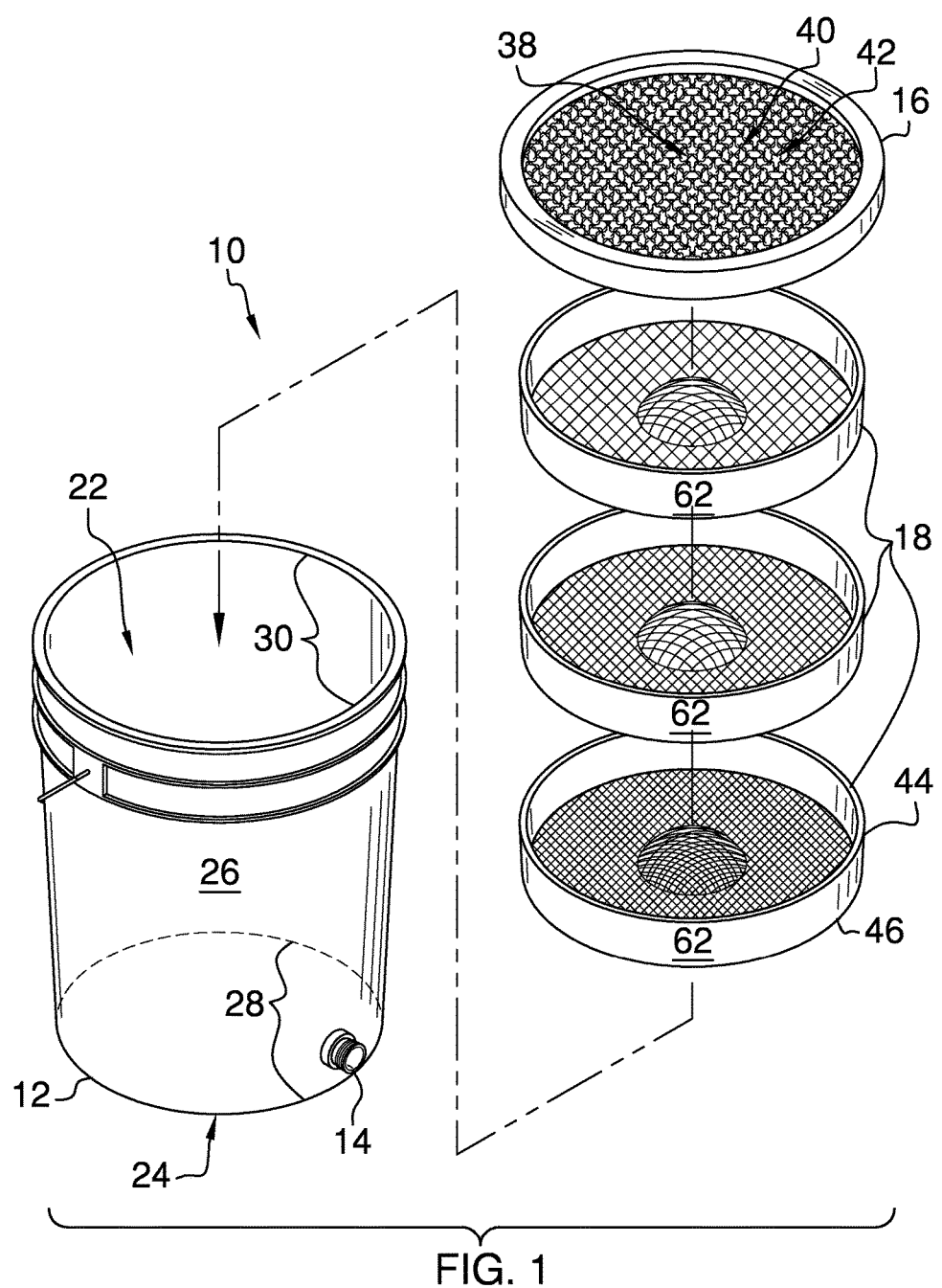
FIG. 1 is an exploded view of a water filtration device for purifying water according to an embodiment of the disclosure.
Figure 2:
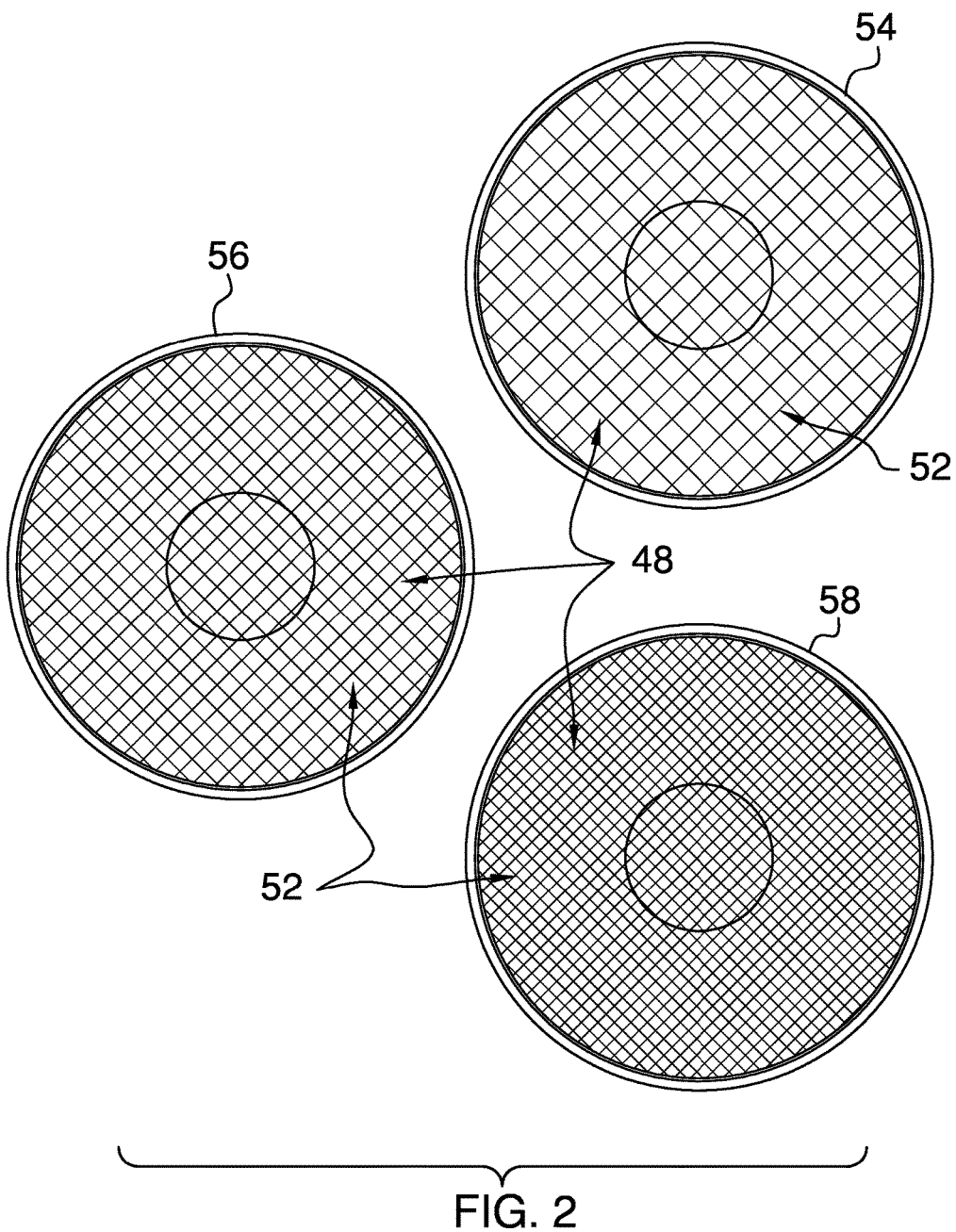
FIG. 2 is a top detail view of an embodiment of the disclosure.
Figure 3:
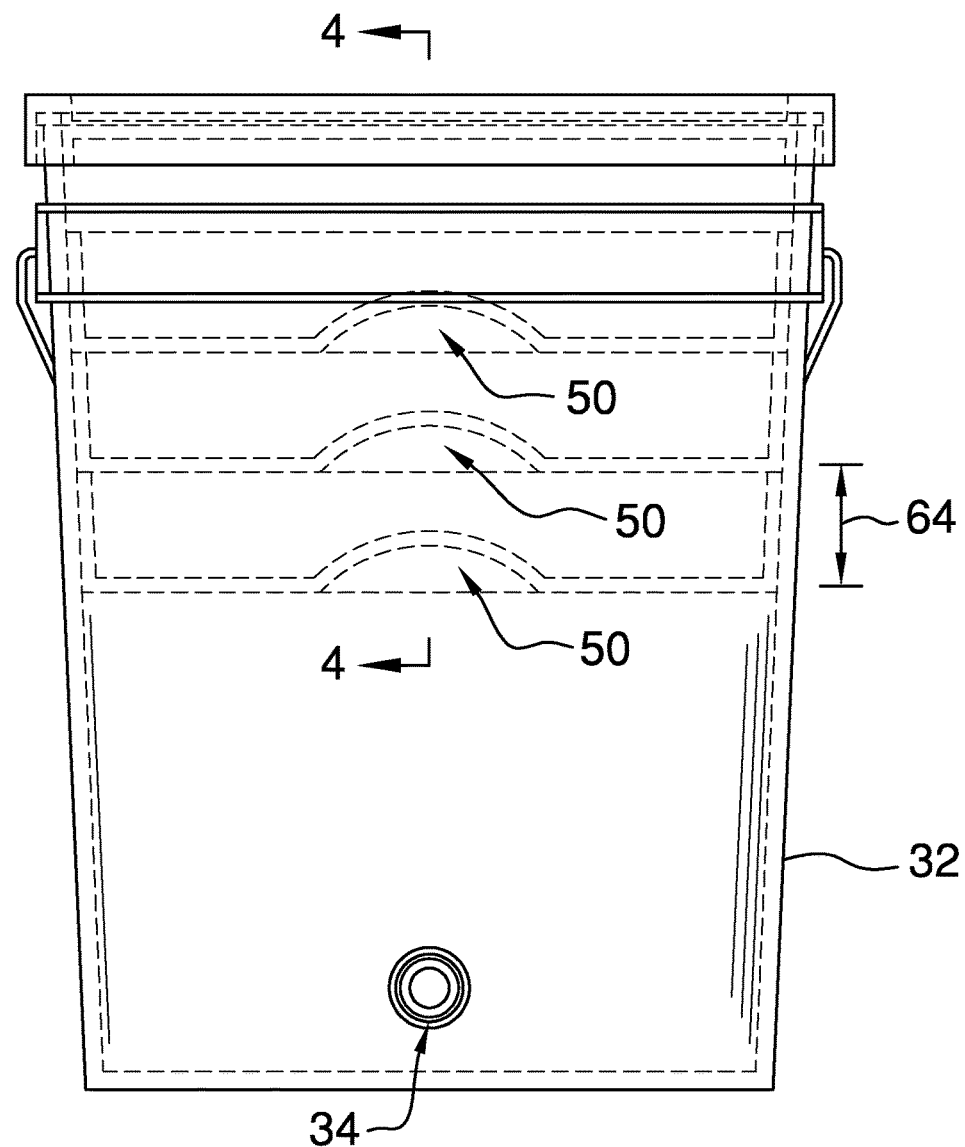
FIG. 3 is a cut-away view of an embodiment of the disclosure.
Figure 4:
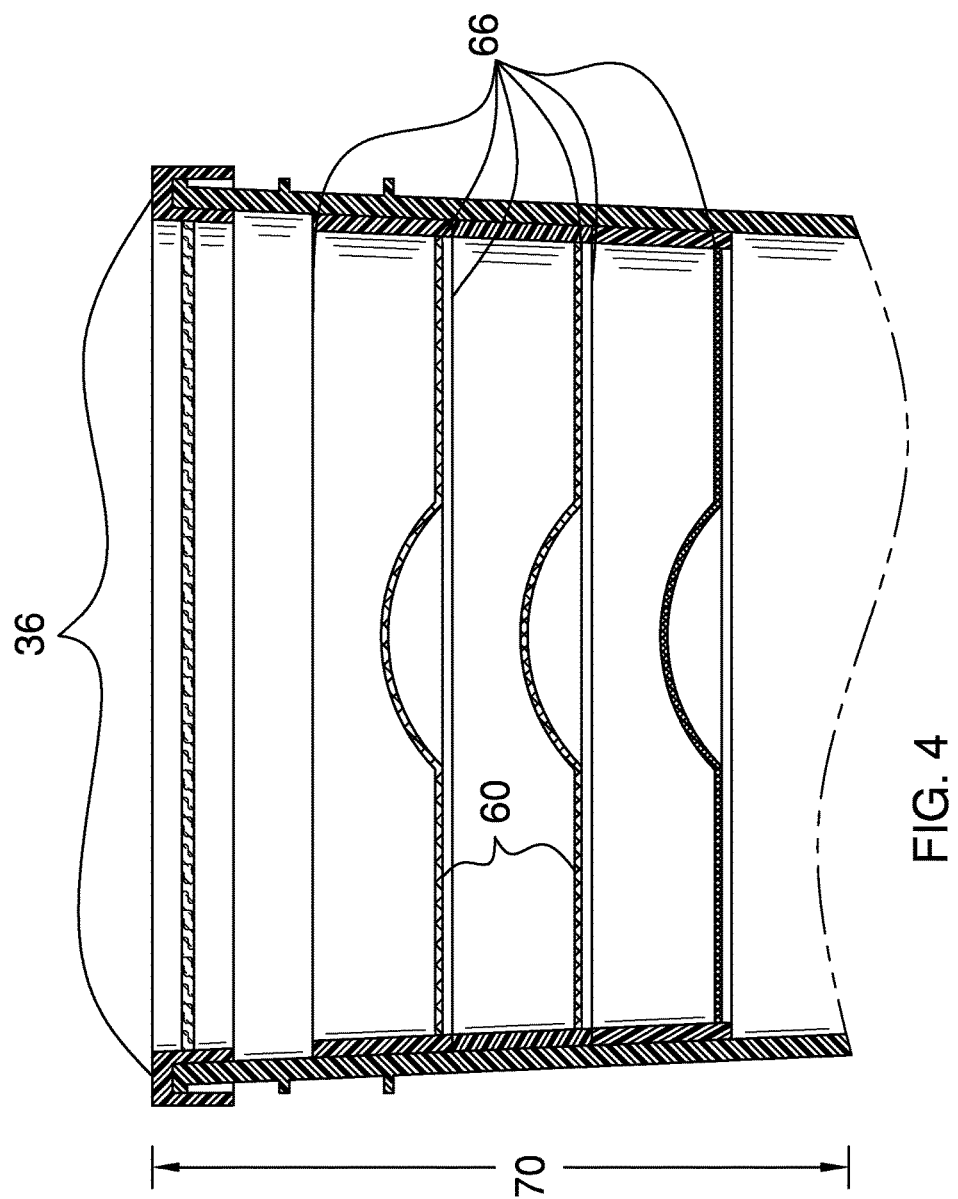
FIG. 4 is a partial cut-away view of an embodiment of the disclosure.

With reference now to the drawings, and in particular to FIGS. 1 through 5 thereof, a new water filtration device embodying the principles and concepts of an embodiment of the disclosure and generally designated by the reference numeral 10 will be described.

As best illustrated in FIGS. 1 through 6, the water filtration device for purifying water 10 generally comprises a housing 12, a tap 14, a top cover 16, a plurality of filters 18, and a handle 20. The housing 12 has an upper opening 22, a closed bottom 24 and a sidewall 26. The bottom 24 has a perimeter 28 and the sidewall 26 extends upward from the perimeter 28 of the bottom 24 to form the opening 22. The opening 22 and the bottom 24 are circular. The opening 22 has a circumference 30. The circumference 30 of the opening 22 is greater than the perimeter 28 of the bottom 24. The sidewall 26 is in the form of a tapered cylinder 32. The tap 14 extends through the sidewall 26 proximate to the bottom 24. The tap 14 is a standard threaded hose connection 34. The top cover 16 has a rim 36 and a porous medial surface 38 that extends inwardly from the rim 36. The rim 36 is configured to engage the sidewall 26 to cover the opening 22. The medial surface 38 is a cloth 40. The cloth 40 may be a toweling material 42. Each of the filters in the plurality of filters 18 has an upper edge 44, a lower edge 46, and a mesh 48 that extends inwardly from the lower edge 46. The mesh 48 has a concavity 50 that extends toward the upper edge 44. The concavity 50 is centrally positioned in the mesh 48. The mesh 48 may be a wire mesh 52. The plurality of filters 18 is stackable within the housing 12. The plurality of filters 18 comprises a course mesh filter 54, a medium mesh filter 56, and a fine mesh filter 58. Each of the filters in the plurality of filters 18 is circular with the lower edge 46 and the upper edge 44 each have a diameter 60. The filter has a band 62 that extends between the upper edge 44 and the lower edge 46. The band 62 is rigid and has a height 64. The height 64 is between 5 and 15 centimeters, preferably the height 64 is between 7.5 and 12.5 centimeters, more preferably the height 64 is between 9 and 10 centimeters. The diameters 60 of the plurality of filters 18 comprise a collection of diameters 66 such that the plurality of filters 18 are stackable within the tapered cylinder 32 with the course mesh filter 54 above the medium mesh filter 56 and the medium mesh filter 56 above the fine mesh filter 58. The plurality of filters 18 engages the interior surface 68 of the sidewall 26 to secure the plurality of filters 18 in the upper half 70 of the housing 12. The handle 20 has a pair of attachment ends 72 and a central grasping section 74. The pair of attachment ends 72 is configured to engage an associated pair of opposing attachment points 76 coupled to the exterior surface 78 of the sidewall 26 proximate to the upper opening 22.

In use, the housing 12 is configured with the course mesh filter 54 above the medium mesh filter 56 and the medium mesh filter 56 above the fine mesh filter 58 within the upper half 70 of the housing 12. The rim 36 of the top cover 16 is configured to engage the sidewall 26 to cover the opening 22. A user may pour contaminated water through the top cover 16 and the water will pass through the plurality of filters 18, such that the user may access the filtered water via the tap 14 using a garden hose 80.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water filtration device for purifying water, said device comprising:
a housing, said housing having an upper opening, a closed bottom and a sidewall,
a tap, said tap extending through said sidewall proximate to said bottom,
a top cover, said top cover having a rim and a porous medial surface extending inwardly from said rim, said rim being configured to engage said sidewall to cover said opening,
a plurality of filters, each of said filters having an upper edge, a lower edge, and a mesh extending inwardly from said lower edge, said plurality of filters being stackable within said housing, said plurality of filters comprising a course mesh filter, a medium mesh filter, and a fine mesh filter, each said filter having a band extending between said upper edge and said lower edge, said course mesh filter being above said medium mesh filter and said medium mesh filter being above said fine mesh filter, and wherein said plurality of filters engage an interior surface of said sidewall to secure said plurality of filters in an upper half of said housing;
a handle, said handle having a pair of attachment ends and a central grasping section, said pair of attachment ends being configured to engage an associated pair of opposing attachment points coupled to the exterior surface of said sidewall proximate to said upper opening,
wherein said housing is configured with said plurality of filters and said rim of said top cover is configured to engage said sidewall to cover said opening, and wherein a user may pour contaminated water through said top cover and the water will pass through said plurality of filters, and wherein the user may access the filtered water via said tap using a garden hose.

2. The device of claim 1, further comprising:
said bottom having a perimeter,
said sidewall extending upward from said perimeter of said bottom to form said opening; and
said opening and said bottom being circular.

3. The device of claim 1, further comprising:
said opening having a circumference, said circumference of said opening being greater than said perimeter of said bottom; and
said sidewall being in the form of a tapered cylinder.

4. The device of claim 1, further including said tap being a standard threaded hose connection.

5. The device of claim 1, further including said medial surface of said top cover being cloth.

6. The device of claim 1, further including said medial surface of said top cover being toweling.

7. The device of claim 1, further including said mesh having a concavity extending toward said upper edge.

8. The device of claim 7, further including said concavity being centrally positioned in said mesh.

9. The device of claim 1, further including said mesh being a wire mesh.

10. The device of claim 1, further comprising each of said course mesh filter, medium mesh filter, and fine mesh filter having:
said filter being circular,
said lower edge and each of said upper edge having a diameter; and
said band being rigid, said band having a height, said height being between 5 and 15 centimeters.

11. The device of claim 10, further including said height being between 7.5 and 12.5 centimeters.

12. The device of claim 11, further said height being between 9 and 10 centimeters.

13. The device of claim 10, further including said diameters of said plurality of filters comprising a collection of diameters wherein said filters are stackable within said tapered cylinder.

14. A water filtration device for purifying water, said device comprising:
a housing, said housing having an upper opening, a closed bottom and a sidewall, said bottom having a perimeter, said sidewall extending upward from said perimeter of said bottom to form said opening, said opening and said bottom being circular, said opening having a circumference, said circumference of said opening being greater than said perimeter of said bottom, said sidewall being in the form of a tapered cylinder,
a tap, said tap extending through said sidewall proximate to said bottom, said tap being a standard threaded hose connection,
a top cover, said top cover having a rim and a porous medial surface extending inwardly from said rim, said rim being configured to engage said sidewall to cover said opening, said medial surface being cloth, said medial surface being toweling,
a plurality of filters, each of said filters having an upper edge, a lower edge, and a mesh extending inwardly from said lower edge, said mesh having a concavity extending toward said upper edge, said concavity being centrally positioned in said mesh, said mesh being a wire mesh, said plurality of filters being stackable within said housing, said plurality of filters comprising a course mesh filter, a medium mesh filter, and a fine mesh filter, said filter being circular and said lower edge and said upper edge having a diameter, said filter having a band extending between said upper edge and said lower edge, said band being rigid, said band having a height, said height being between 5 and 15 centimeters, said height being between 7.5 and 12.5 centimeters, said height being between 9 and 10 centimeters, said diameters of said plurality of filters comprising a collection of diameters wherein said filters are stackable within said tapered cylinder with said course mesh filter above said medium mesh filter and said medium mesh filter above said fine mesh filter, and wherein said plurality of filters engage an interior surface of said sidewall to secure said plurality of filters in an upper half of said housing;
a handle, said handle having a pair of attachment ends and a central grasping section, said pair of attachment ends being configured to engage an associated pair of opposing attachment points coupled to the exterior surface of said sidewall proximate to said upper opening; and
wherein said housing is configured with said course mesh filter above said medium mesh filter and said medium mesh filter above said fine mesh filter within said upper half of said housing, and said rim of said top cover is configured to engage said sidewall to cover said opening, and wherein a user may pour contaminated water through said top cover and the water will pass through said plurality of filters, and wherein the user may access the filtered water via said tap using a garden hose.

\* \* \* \* \*